(12) United States Patent
Pierpont

(10) Patent No.: US 6,397,598 B1
(45) Date of Patent: Jun. 4, 2002

(54) TURBOCHARGER SYSTEM FOR AN INTERNAL COMBUSTION ENGINE

(75) Inventor: David A. Pierpont, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/678,605

(22) Filed: Oct. 4, 2000

(51) Int. Cl.⁷ .............................................. F02B 33/44
(52) U.S. Cl. ................. 60/612; 60/605.1; 60/605.2; 60/602; 123/562
(58) Field of Search ................. 60/612, 605.1, 60/605.2, 602; 123/559.1, 562

(56) References Cited

U.S. PATENT DOCUMENTS

| | | | |
|---|---|---|---|
| 3,250,068 A | 5/1966 | Vulliamy | 60/612 |
| 3,257,797 A | 6/1966 | Lieberherr | 60/599.1 |
| 3,977,195 A * | 8/1976 | Treuil | 60/612 |
| 4,032,262 A * | 6/1977 | Zehnder | 60/612 |
| 4,173,868 A * | 11/1979 | Wunsch | 60/612 |
| 4,179,892 A * | 12/1979 | Heydrich | 60/605.1 |
| 4,231,225 A | 11/1980 | Aya | 60/612 |
| 4,426,848 A | 1/1984 | Stachowicz | |
| 4,474,008 A | 10/1984 | Sakurai et al. | 60/605.1 |
| 4,563,132 A * | 1/1986 | Grimmer | 60/612 |
| 5,142,866 A | 9/1992 | Yanagihara et al. | 60/605.2 |
| 5,564,275 A | 10/1996 | Codan et al. | 60/605.2 |
| 5,611,202 A | 3/1997 | Sumser et al. | 60/605.2 |
| 5,611,203 A | 3/1997 | Henderson et al. | 60/605.2 |
| 5,617,726 A | 4/1997 | Sheridan et al. | 60/605.2 |
| 5,771,868 A | 6/1998 | Khair | 60/605.2 |
| 6,205,785 B1 * | 3/2001 | Coleman | 60/605.2 |

FOREIGN PATENT DOCUMENTS

| | | | | |
|---|---|---|---|---|
| DE | 3629841 A1 * | 5/1987 | | 60/602 |
| DE | 36 29 841 A1 * | 5/1987 | | 60/612 |
| JP | 361164039 A * | 7/1986 | | 123/562 |
| JP | 362085123 A * | 4/1987 | | 123/562 |
| JP | 363009616 A * | 1/1988 | | 60/612 |
| JP | 363009617 A * | 1/1988 | | 60/612 |
| JP | 403033430 A * | 2/1991 | | 123/562 |

* cited by examiner

Primary Examiner—Thomas Denion
Assistant Examiner—Thai-Ba Trieu
(74) Attorney, Agent, or Firm—Taylor & Aust, PC

(57) ABSTRACT

An internal combustion engine is provided with a plurality of combustion cylinders, at least one exhaust manifold and at least one intake manifold. Each exhaust manifold is coupled with a plurality of the combustion cylinders. Each intake manifold is coupled with a plurality of the combustion cylinders. A first turbocharger includes a first turbine having at least one inlet and an outlet, and a first compressor having an inlet and an outlet. The at least one first turbine inlet is fluidly coupled with a corresponding exhaust manifold, and the first compressor outlet is fluidly coupled with the intake manifold. A second turbocharger includes a second turbine having at least one inlet and an outlet, and a second compressor having an inlet and an outlet. The at least one second turbine inlet is fluidly coupled with the first turbine outlet and with a corresponding exhaust manifold. The second compressor outlet is fluidly coupled with the first compressor inlet.

12 Claims, 1 Drawing Sheet

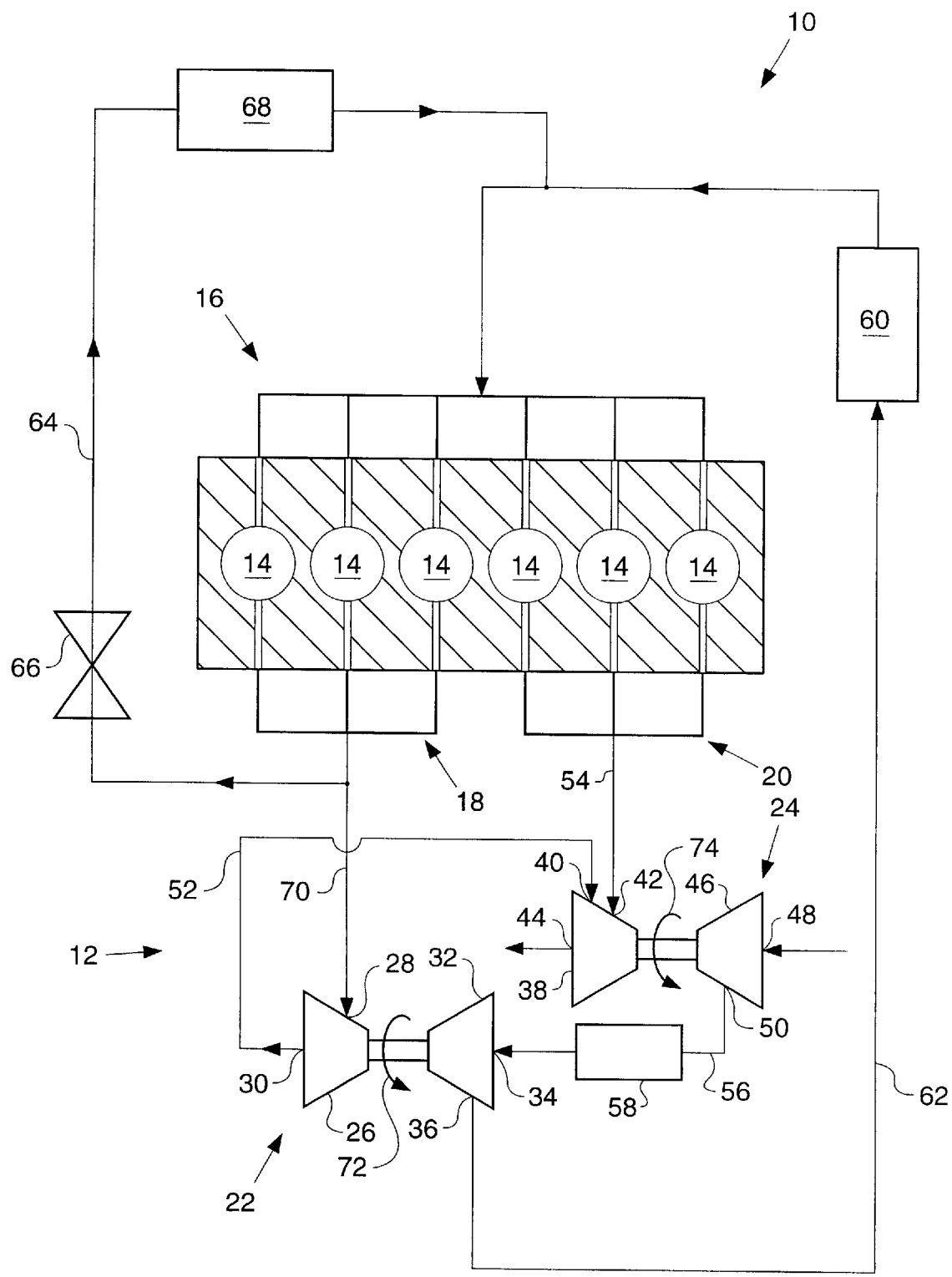

TURBOCHARGER SYSTEM FOR AN INTERNAL COMBUSTION ENGINE

TECHNICAL FIELD

The present invention relates to a turbocharger system for use in an internal combustion engine, and, more particularly, to a turbocharger system having series connected compressors and turbines.

BACKGROUND ART

An internal combustion engine may include one or more turbochargers for compressing a fluid which is supplied to one or more combustion chambers within corresponding combustion cylinders. Each turbocharger typically includes a turbine driven by exhaust gases of the engine and a compressor which is driven by the turbine. The compressor receives the fluid to be compressed and supplies the compressed fluid to the combustion chambers. The fluid which is compressed by the compressor may be in the form of combustion air or a fuel and air mixture.

It is known to provide multiple turbochargers within a turbocharger system in an internal combustion engine. For example, U.S. Pat. No. 3,250,068 (Vulliamy) discloses an internal combustion engine having two turbochargers. A first turbocharger includes a turbine which is driven by a single exhaust manifold on the internal combustion engine. The spent exhaust gas from the turbine of the first turbocharger is transported in a series manner to the inlet of a turbine of the second turbocharger. The spent exhaust gas is then discharged to the ambient environment from the turbine of the second turbocharger. The compressor of the second turbocharger compresses ambient combustion air and provides the compressed combustion air in a series manner to the compressor of the first turbocharger, which in turn transports the compressed combustion air to the intake manifold of the engine.

A problem with a turbocharger system as described above is that the spent exhaust gas from the turbine of the turbocharger may not have enough energy to provide a desired compression ratio within the second turbocharger. The overall compression ratio from the turbocharger system is thus limited according to the amount of energy available at the turbine of the second turbocharger.

The present invention is directed to overcoming one or more of the problems as set forth above.

DISCLOSURE OF THE INVENTION

In one aspect of the invention, an internal combustion engine is provided with a plurality of combustion cylinders, at least one exhaust manifold and at least one intake manifold. Each exhaust manifold is coupled with a plurality of the combustion cylinders. Each intake manifold is coupled with a plurality of the combustion cylinders. A first turbocharger includes a first turbine having at least one inlet and an outlet, and a first compressor having an inlet and an outlet. The at least one first turbine inlet is fluidly coupled with a corresponding exhaust manifold, and the first compressor outlet is fluidly coupled with the intake manifold. A second turbocharger includes a second turbine having at least one inlet and an outlet, and a second compressor having an inlet and an outlet. The at least one second turbine inlet is fluidly coupled with the first turbine outlet and with a corresponding exhaust manifold. The second compressor outlet is fluidly coupled with the first compressor inlet.

In another aspect of the invention, a method of operating an internal combustion engine is provided with the steps of: transporting exhaust gas from a plurality of combustion cylinders to at least one exhaust manifold; providing a first turbocharger including a first turbine having an inlet and an outlet, and a first compressor having an inlet and an outlet; providing a second turbocharger including a second turbine having at least one inlet and an outlet, and a second compressor having an inlet and an outlet; rotatably driving the first turbine with exhaust gas introduced at the first turbine inlet from a corresponding exhaust manifold; rotatably driving the second turbine with exhaust gas introduced at the at least one second turbine inlet from each of the first turbine outlet and a corresponding exhaust manifold; introducing combustion air at the second compressor inlet; transporting compressed combustion gas from the second compressor outlet to the first compressor inlet; and transporting compressed combustion gas from the first compressor outlet to at least one intake manifold.

BRIEF DESCRIPTION OF THE DRAWINGS

The sole FIGURE is a schematic representation of an internal combustion engine including an embodiment of a turbocharger system of the present invention.

BEST MODE FOR CARRYING OUT THE INVENTION

Referring now to the drawing, there is shown an embodiment of an internal combustion engine 10 including an embodiment of a turbocharger system 12 of the present invention.

Internal combustion engine 10 includes a plurality of combustion cylinders 14, each of which are coupled with a corresponding intake manifold 16 and exhaust manifold 18, 20. Internal combustion engine 10 includes one or more intake manifolds 16, and in the embodiment shown includes a single intake manifold 16 which is fluidly coupled with each combustion cylinder 14. Internal combustion engine 10 also includes one or more exhaust manifolds, and in the embodiment shown includes two exhaust manifolds 18 and 20. Exhaust manifold 18 is fluidly coupled with three combustion cylinders 14, and exhaust manifold 20 is fluidly coupled with the remaining three combustion cylinders 14.

Turbocharger system 12 includes a first turbocharger 22 and a second turbocharger 24. First turbocharger 22 includes a first turbine 26 having an inlet 28 and an outlet 30, and a first compressor 32 having an inlet 34 and an outlet 36. First turbine 26 is mechanically coupled with first compressor 32 and thereby rotatably drives first compressor 32. First turbine inlet 28 is fluidly coupled with exhaust manifold 18, and receives exhaust gas therefrom for rotatably driving first turbine 26. First compressor outlet 30 is fluidly coupled with intake manifold 16 for providing compressed combustion gas to intake manifold 16. An aftercooler 60 is disposed in fluid communication with fluid conduit 62 which interconnects first compressor outlet 36 with intake manifold 16.

Second turbocharger 24 includes a second turbine 38 having two inlets 40, 42 and an outlet 44, and a second compressor 46 having an inlet 48 and an outlet 50. Second turbine inlet 40 is fluidly coupled with first turbine outlet 30 via fluid conduit 52, and second turbine inlet 42 is fluidly coupled with exhaust manifold 20 via fluid conduit 54. Second turbine outlet 44 dischargers spent exhaust gas to an ambient environment.

Second compressor 46 is mechanically coupled with and rotatably driven by second turbine 38. Second compressor inlet 48 receives combustion air from the ambient environment for compressing within second compressor 46. The compressed combustion gas is discharged from second compressor outlet 50 to first compressor inlet 34 via fluid conduit 56. An optional intercooler 58 is disposed in fluid communication with fluid conduit 56 for cooling compressed combustion gas transported from second compressor 46 to first compressor 32.

An EGR duct 64 fluidly interconnects exhaust manifold 18 with intake manifold 16. A valve 66 and cooler 68 are positioned in fluid communication with EGR duct 64. Valve 66 controls a flow of exhaust gas which is recirculated from exhaust manifold 18 to intake manifold 16. Cooler 68 acts as a heat exchanger to cool the exhaust gas which is recirculated to intake manifold 16.

INDUSTRIAL APPLICABILITY

During use, fuel, such as diesel fuel is injected into combustion cylinders 14 and combusted when a piston (not shown) disposed within each combustion cylinder 14 is at or near a top dead center (TDC) position. Exhaust gas is transported from each combustion cylinder 14 to a corresponding exhaust manifold 18 or 20. Exhaust gas within exhaust manifold 18 is transported to first turbine 26 via fluid conduit 70 for rotatably driving first turbine 26. First turbine 26 in turn rotatably drives first compressor 32, as indicated by directional arrow 72.

The spent exhaust gas from first turbine 26 flows from turbine outlet 30 through fluid conduit 52 to second turbine inlet 40 for rotatably driving second turbine 38. Concurrently, exhaust gas from exhaust manifold 20 is transported to second turbine inlet 42 via fluid conduit 54 for driving second turbine 38. The spent exhaust gas is discharged from second turbine outlet 44 to the ambient environment. Second turbine 38 in turn rotatably drives second compressor 46, as indicated by arrow 74. Second compressor 46 draws combustion air into second compressor inlet 48. The combustion air is compressed within second compressor 46 and discharged from second compressor outlet 50 through fluid conduit 56. The compressed combustion air is cooled within intercooler 58 and transported to first compressor inlet 34 for further compressing within first compressor 32. First compressor 32 and second compressor 46 thus form a multi-stage compressor for compressing combustion air which is provided to intake manifold 16.

The compressed combustion air is transported from first compressor outlet 36 through fluid conduit 62 to aftercooler 60. The compressed combustion air is again cooled within aftercooler 60 and transported to intake manifold 16 for use in a combustion process occurring within combustion cylinders 14.

Exhaust gas is recirculated from exhaust manifold 18 to intake manifold 16 via EGR duct 64. Valve 66 is controllably actuated to control the amount of exhaust gas which is recirculated to intake manifold 16 via suitable electrical circuitry (not shown). Cooler 68 is used to cool the exhaust gas which is recirculated to intake manifold 16.

The turbocharger system of the present invention provides multiple turbochargers with turbines and compressors which are fluidly coupled together in a series arrangement to provide improved performance and efficiency. The second turbocharger has a turbine which receives exhaust gas from both an exhaust manifold as well as from the turbine of the first turbocharger. By utilizing the spent exhaust gas from the first turbocharger, the energy associated therewith may be recaptured, along with the energy from the exhaust manifold, and utilized to drive the turbine of the second turbocharger. The turbocharger system is compact, efficient and provides compressed air with a relatively high compression ratio to the intake manifold.

Other aspects, objects and advantages of this invention can be obtained from a study of the drawings, the disclosure and the appended claims.

What is claimed is:

1. A turbocharger system for use with an internal combustion engine having a plurality of combustion cylinders, an intake manifold and at least one exhaust manifold, said turbocharger system comprising:

a first turbocharger including a first turbine having at least one inlet and an outlet, and a first compressor having an inlet and an outlet, said at least one first turbine inlet fluidly couplable with a corresponding exhaust manifold, said first compressor outlet being fluidly couplable with said intake manifold; and a second turbocharger including a second turbine having at least one inlet and an outlet, and a second compressor having an inlet and an outlet, said at least one second turbine inlet fluidly coupled with said first turbine outlet and via a second fluid conduit with a corresponding exhaust manifold, said at least one second turbine inlet including two second turbine inlets, one said second turbine inlet being fluidly couplable with the corresponding exhaust manifold and another said second turbine inlet being fluidly coupled with said first turbine outlet, said second compressor outlet being fluidly coupled with said first compressor inlet.

2. A internal combustion engine, comprising:

a plurality of combustion cylinders;

at least one exhaust manifold, each said exhaust manifold coupled with a plurality of said combustion cylinders;

at least one intake manifold, each said intake manifold coupled with a plurality of said combustion cylinders;

a first turbocharger including a first turbine having at least one inlet and an outlet, and a first compressor having an inlet and an outlet, said at least one first turbine inlet fluidly coupled with a corresponding said exhaust manifold, said first compressor outlet being fluidly coupled with said intake manifold; and a second turbocharger including a second turbine having at least one inlet and an outlet, and a second compressor having an inlet and an outlet, said at least one second turbine inlet fluidly coupled with said first turbine outlet and via a second fluid conduit with a corresponding said exhaust manifold, said at least one second turbine inlet including two second turbine inlets, one said second turbine inlet being fluidly coupled with said corresponding exhaust manifold and another said second turbine inlet being fluidly coupled with said first turbine outlet, said second compressor outlet being fluidly coupled with said first compressor inlet.

3. The internal combustion engine of claim 2, said at least one exhaust manifold including a first exhaust manifold and a second exhaust manifold, said at least one first turbine inlet being fluidly coupled with said first exhaust manifold, said one second turbine inlet being fluidly coupled with said second exhaust manifold.

4. The internal combustion engine of claim 2, including an exhaust gas recirculation duct interconnecting at least one said exhaust manifold and said intake manifold.

5. The internal combustion engine of claim 4, said at least one exhaust manifold including a first exhaust manifold and a second exhaust manifold, said at least one first turbine inlet being fluidly coupled with said first exhaust manifold, said at least one second turbine inlet being fluidly coupled with said second exhaust manifold, said exhaust gas recirculation duct interconnecting said first exhaust manifold and said intake manifold.

6. The internal combustion engine of claim 5, including a valve and a cooler associated with said exhaust gas recirculation duct.

7. The internal combustion engine of claim 2, including an aftercooler fluidly interconnecting said first compressor outlet and at least one said intake manifold.

8. The internal combustion engine of claim 7, including an intercooler fluidly interconnecting said second compressor outlet and said first compressor inlet.

9. A method of operating an internal combustion engine, comprising the steps of:

transporting exhaust gas from a plurality of combustion cylinders to at least one exhaust manifold, said at least one exhaust manifold being a multi-part exhaust manifold including a first exhaust manifold and a second exhaust manifold;

providing a first turbocharger including a first turbine having an inlet and an outlet, and a first compressor having an inlet and an outlet;

providing a second turbocharger including a second turbine having at least one inlet and an outlet, and a second compressor having an inlet and an outlet;

rotatably driving said first turbine with exhaust gas introduced at said first turbine inlet from a corresponding said exhaust manifold, said step of rotatably driving said first turbine including driving said first turbine with exhaust gas from said first exhaust manifold;

rotatably driving said second turbine with exhaust gas introduced at said at least one second turbine inlet from each of said first turbine outlet and a corresponding said exhaust manifold, said step of rotatably driving said second turbine including driving said second turbine with exhaust gas from said second exhaust manifold, said at least one second turbine inlet including two second turbine inlets, one said second turbine inlet coupled with said first turbine outlet and another said second turbine inlet coupled with said second exhaust manifold;

introducing combustion air at said second compressor inlet;

transporting compressed combustion gas from said second compressor outlet to said first compressor inlet; and transporting compressed combustion gas from said first compressor outlet to at least one intake manifold.

10. The method of claim 9, including the step of recirculating exhaust gas in an exhaust gas recirculation duct interconnecting at least one said exhaust manifold and said intake manifold.

11. The method of claim 9, including the step of fluidly interconnecting said first compressor outlet and at least one said intake manifold with an aftercooler.

12. The method of claim 11, including the step of fluidly interconnecting said second compressor outlet and said first compressor inlet with an intercooler.

* * * * *